United States Patent
Kim et al.

(10) Patent No.: US 12,066,526 B2
(45) Date of Patent: Aug. 20, 2024

(54) METHOD AND APPARATUS FOR CALCULATING ALTITUDE OF TARGET

(71) Applicant: Electronics and Telecommunications Research Institute, Daejeon (KR)

(72) Inventors: Hyung Ju Kim, Daejeon (KR); Sung Jin Yoo, Daejeon (KR); Byung Jang Jeong, Seoul (KR); Woo Jin Byun, Daejeon (KR); In Kui Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 371 days.

(21) Appl. No.: 17/557,831

(22) Filed: Dec. 21, 2021

(65) Prior Publication Data
US 2022/0196827 A1    Jun. 23, 2022

(30) Foreign Application Priority Data
Dec. 22, 2020   (KR) .................. 10-2020-0180644

(51) Int. Cl.
| | | |
|---|---|---|
| *G01S 13/88* | (2006.01) | |
| *G01S 7/41* | (2006.01) | |
| *G01S 13/00* | (2006.01) | |
| *G01S 13/42* | (2006.01) | |

(52) U.S. Cl.
CPC ............ *G01S 13/882* (2013.01); *G01S 7/418* (2013.01); *G01S 13/003* (2013.01); *G01S 13/424* (2013.01)

(58) Field of Classification Search
CPC ...... G01S 13/003; G01S 13/42; G01S 13/424; G01S 13/882; G01S 7/418
See application file for complete search history.

(56) References Cited

U.S. PATENT DOCUMENTS

| | | | | |
|---|---|---|---|---|
| 6,362,775 | B1 * | 3/2002 | Goebel | .................. G01S 13/87 342/63 |
| 10,816,641 | B2 | 10/2020 | Koerber et al. | |
| 2011/0285577 | A1 * | 11/2011 | Sun | ......................... G01S 13/36 342/21 |
| 2015/0226848 | A1 | 8/2015 | Park | |

(Continued)

FOREIGN PATENT DOCUMENTS

| | | |
|---|---|---|
| KR | 10-2011-0126896 | 11/2011 |
| KR | 10-2012-0010632 | 2/2012 |

(Continued)

*Primary Examiner* — Timothy X Pham
(74) *Attorney, Agent, or Firm* — KILE PARK REED & HOUTTEMAN PLLC

(57) ABSTRACT

A method for calculating an altitude of a target through an apparatus for calculating an altitude of the target, which comprises a plurality of MIMO radar virtual antennas, may comprise: receiving electromagnetic waves reflected from the target through a pair of virtual antennas classified into an upper antenna and a lower antenna and alternately arranged in two columns linearly; obtaining range information and phase information of the target from the pair of virtual antennas by analyzing the electromagnetic waves; and calculating altitude information of the target from position information of the pair of virtual antennas, and the range information and the phase information.

10 Claims, 18 Drawing Sheets

(56) References Cited

U.S. PATENT DOCUMENTS

| | | |
|---|---|---|
| 2015/0369904 A1 | 12/2015 | Heo et al. |
| 2019/0079164 A1 | 3/2019 | Lim et al. |
| 2020/0064461 A1 | 2/2020 | Hwang et al. |
| 2024/0061076 A1 | 2/2024 | Kim |

FOREIGN PATENT DOCUMENTS

| | | |
|---|---|---|
| KR | 10-2012-0089020 | 8/2012 |
| KR | 10-2020-0086178 | 7/2020 |
| WO | WO_2020154903 A1 * | 1/2019 |

* cited by examiner

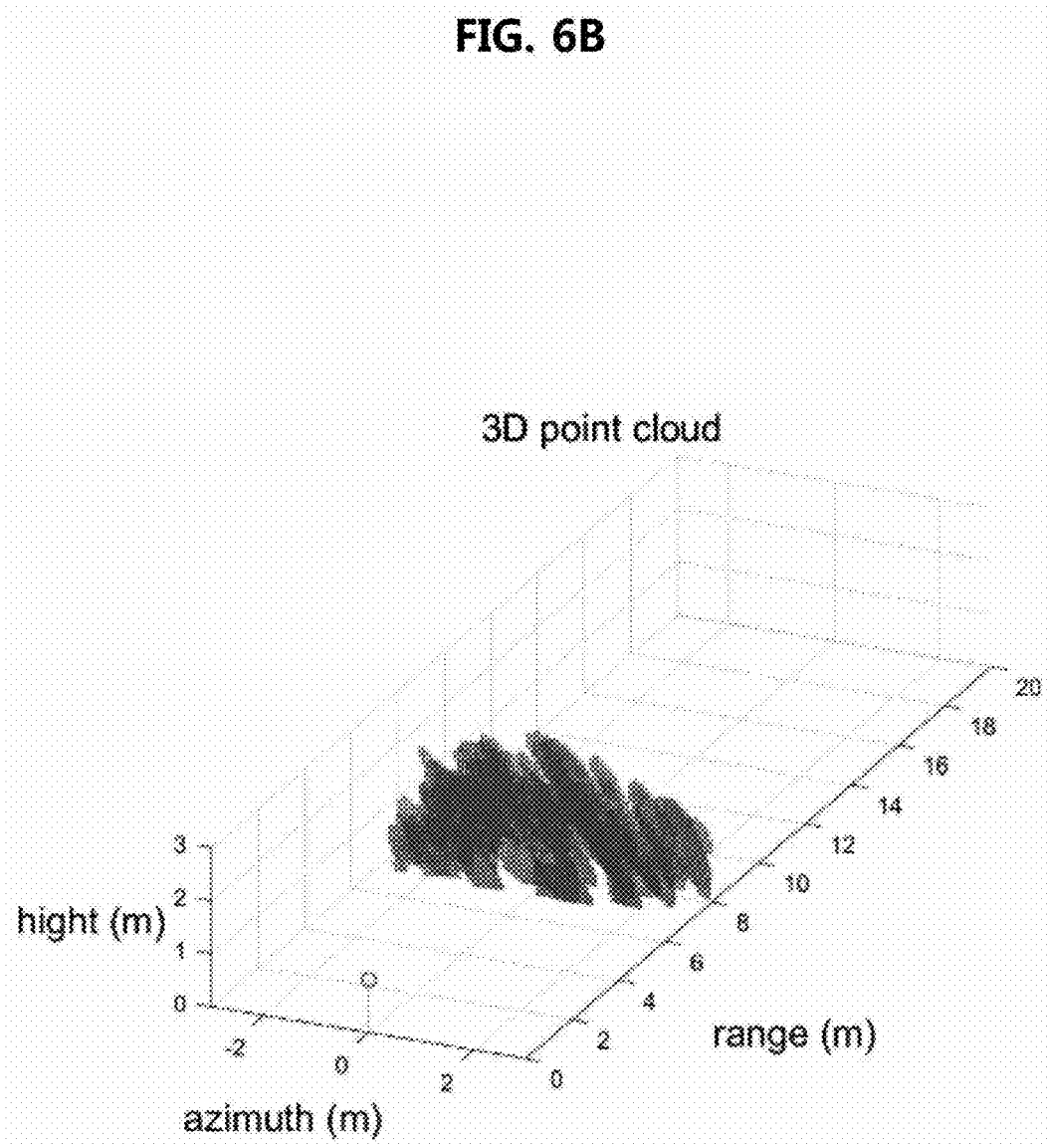

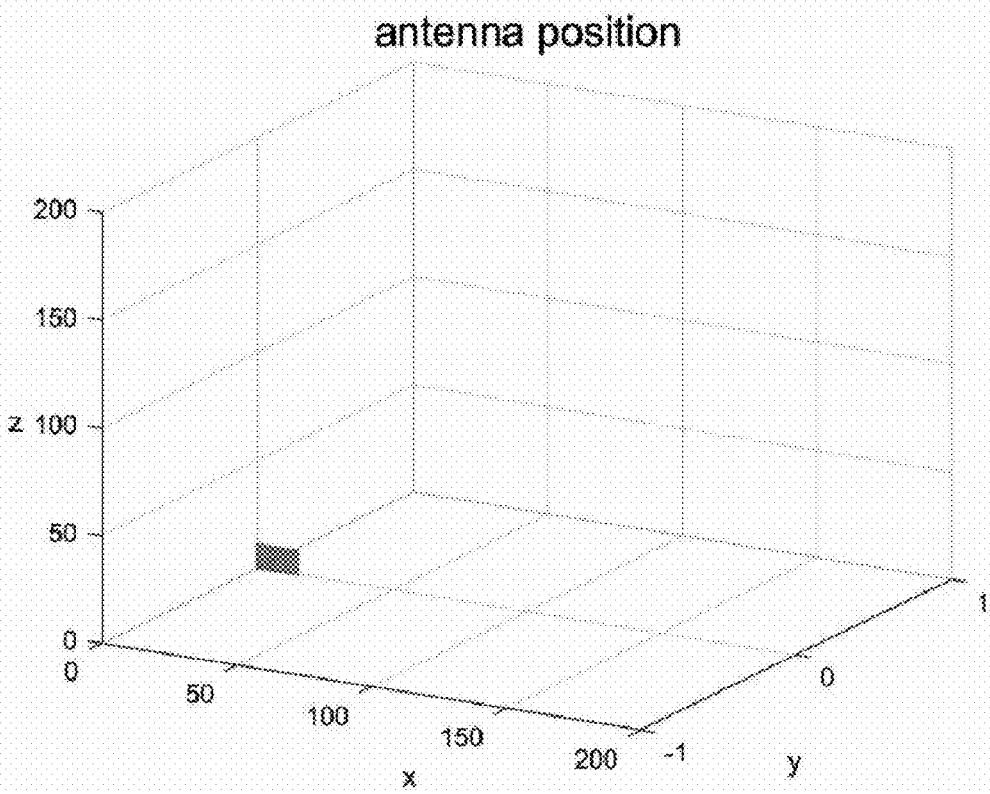

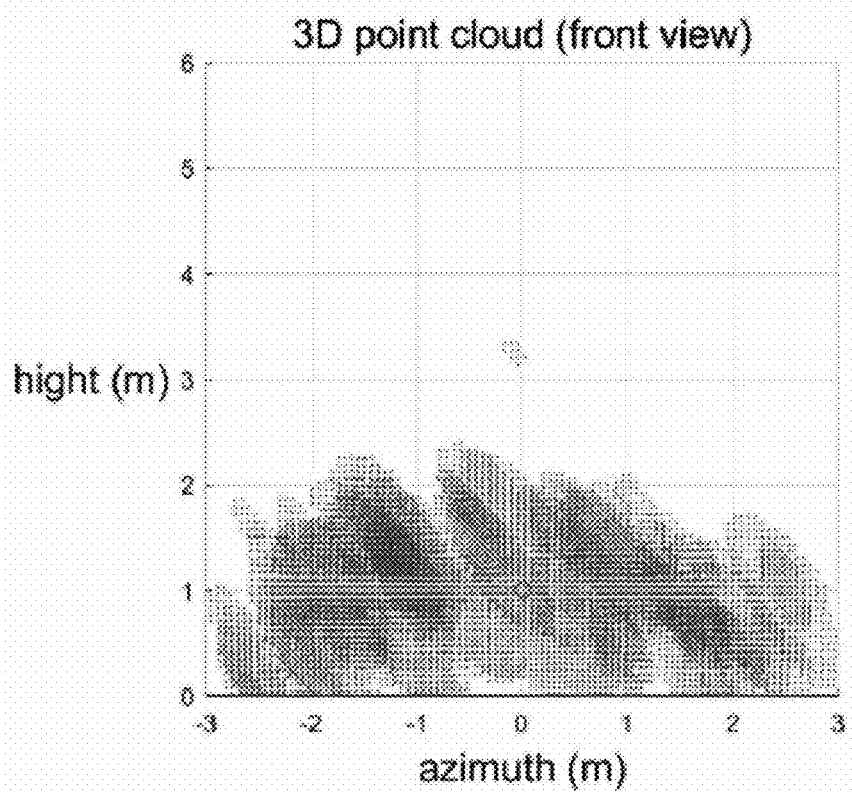

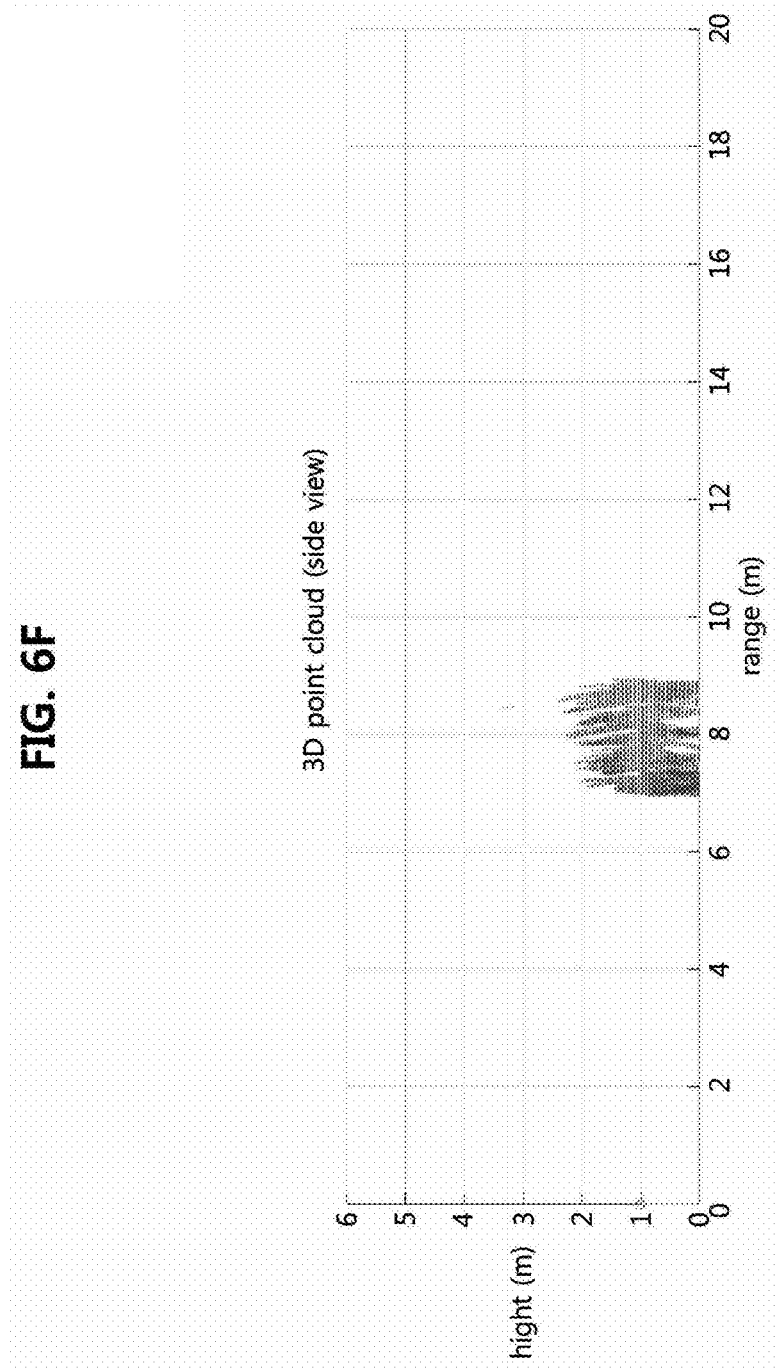

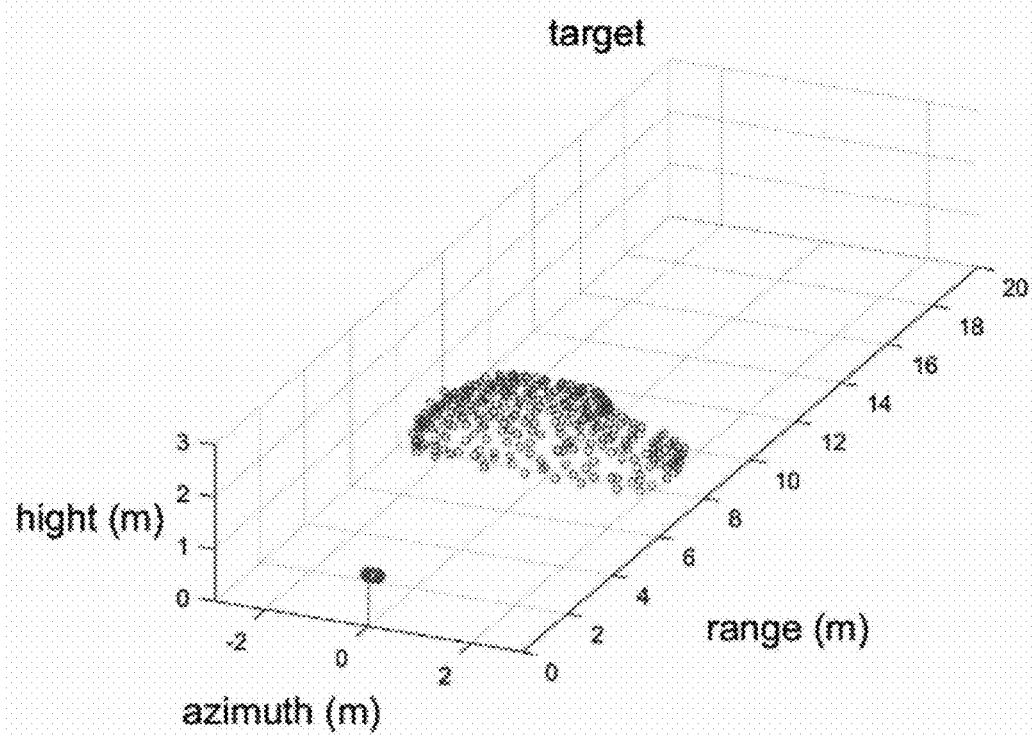

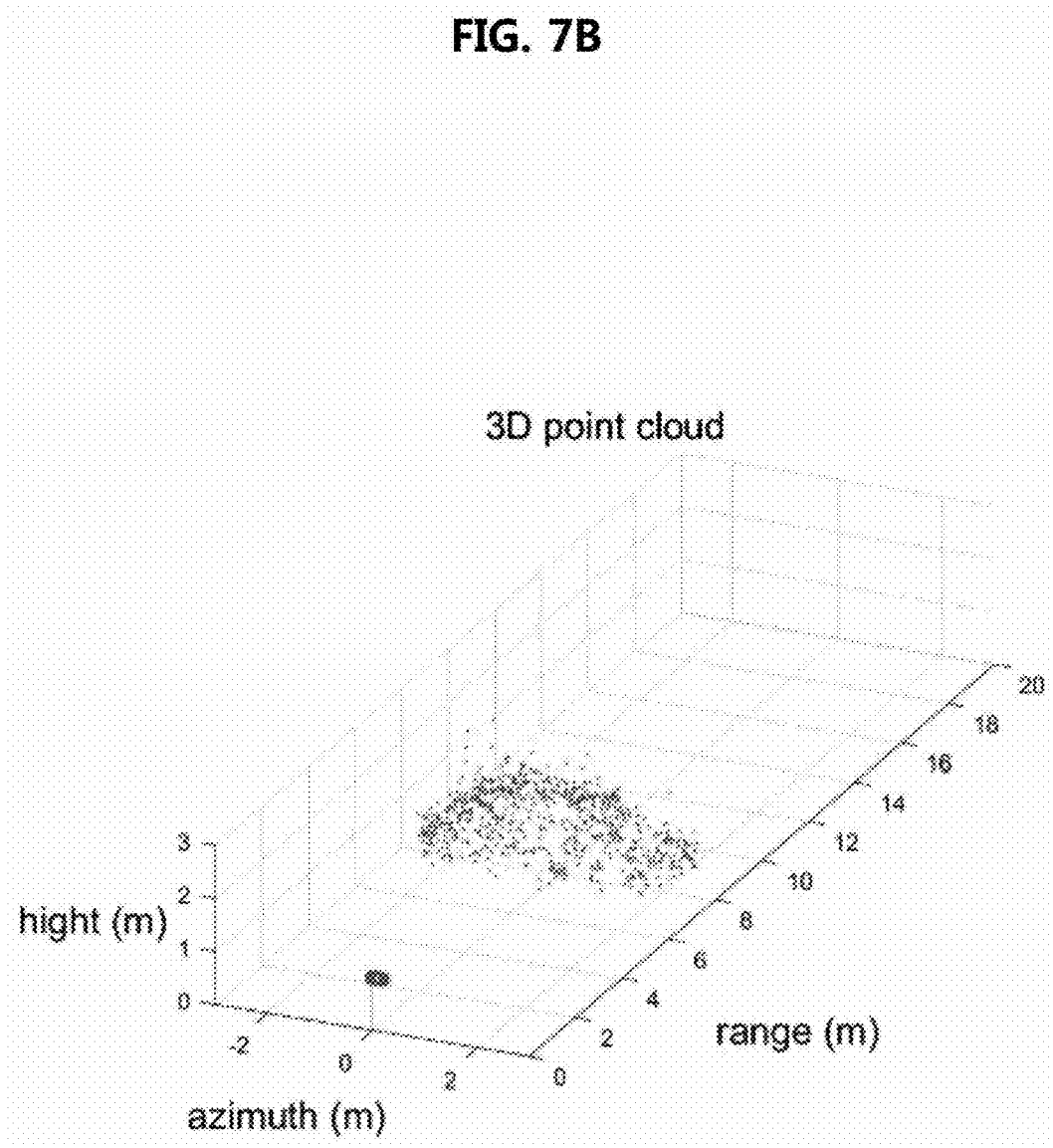

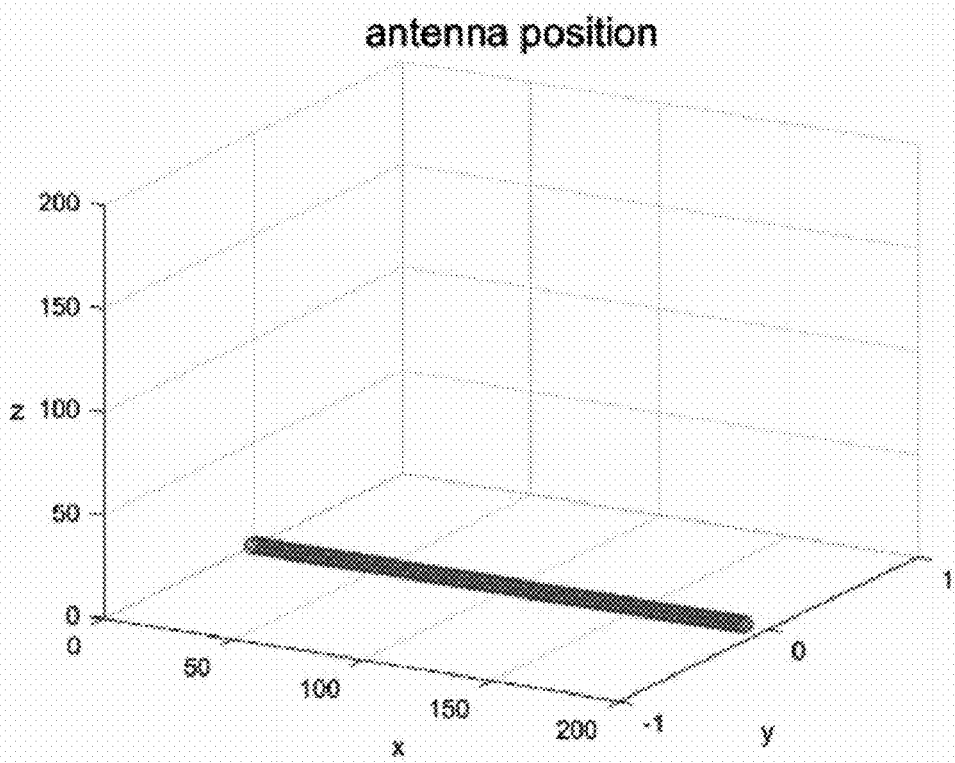

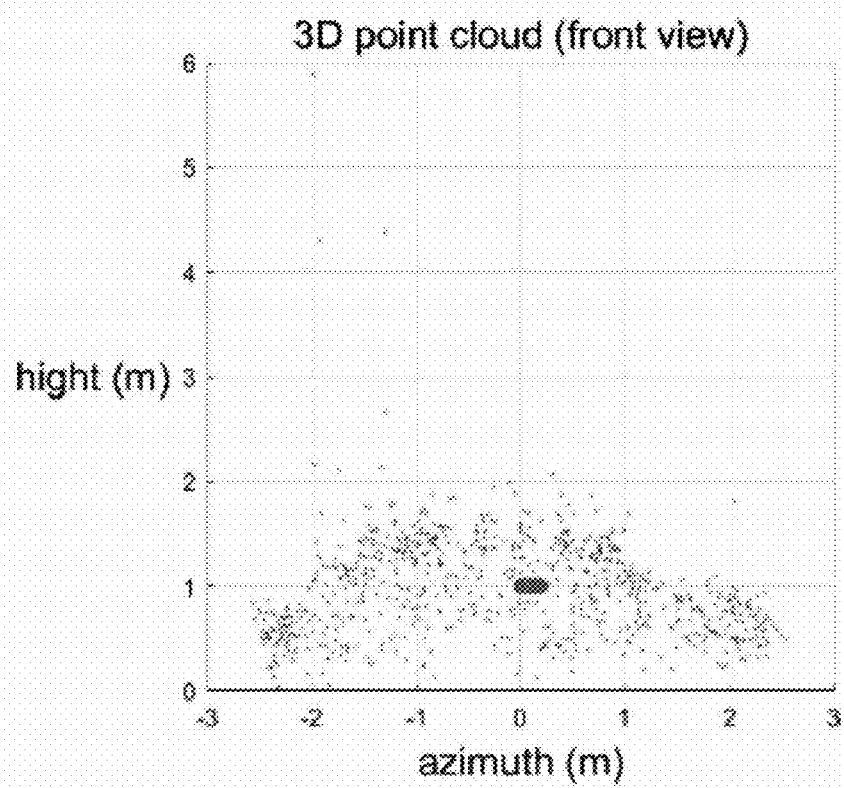

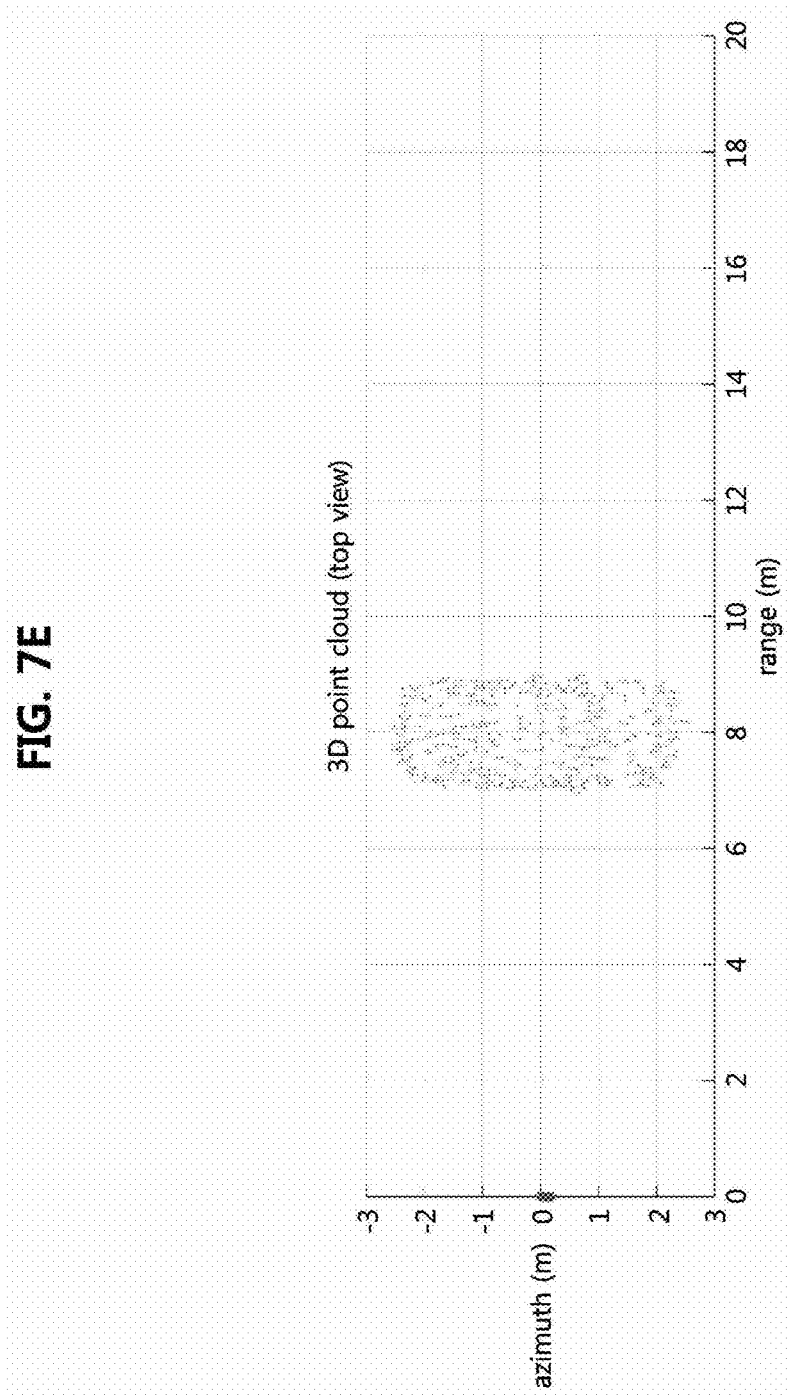

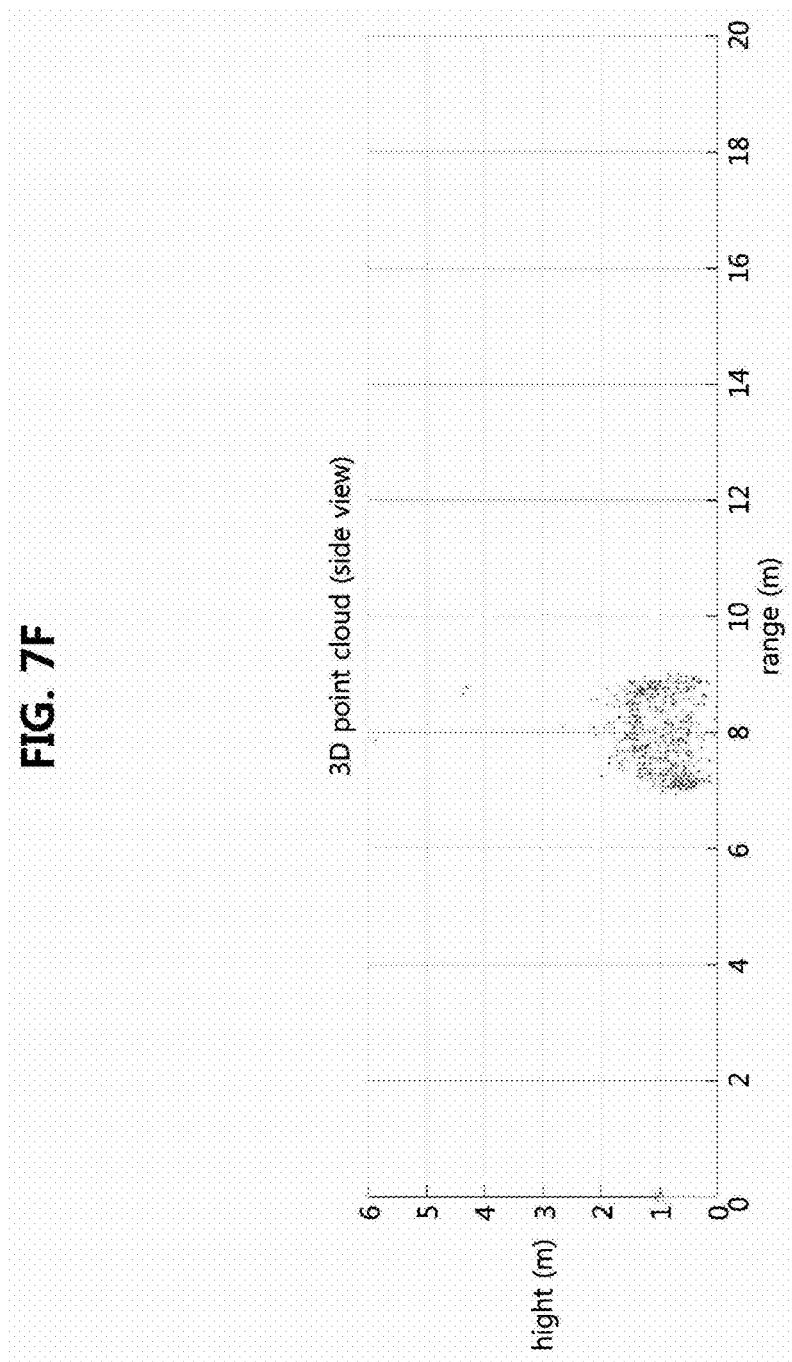

METHOD AND APPARATUS FOR CALCULATING ALTITUDE OF TARGET

CROSS-REFERENCE TO RELATED APPLICATIONS

This application claims priority to Korean Patent Application No. 10-2020-0180644, filed on Dec. 22, 2020, filed with the Korean Intellectual Property Office (KIPO), the entire contents of which are hereby incorporated by reference.

BACKGROUND

1. Technical Field

The present disclosure relates to a method and apparatus for calculating an altitude of a target, and more particularly, to a method for calculating an altitude of a target through an apparatus for calculating an altitude of a target, which includes a plurality of multiple input multiple output (MIMO) radar virtual antennas.

2. Related Art

A radar is a sensor that radiates electromagnetic waves through a transmitting antenna, receives a reflected signal scattered by a target through a receiving antenna, and obtains a range to the target through a radar signal processing procedure. To obtain the range to the target, sensors such as cameras, lidars, etc., are often used, but the radar, as a sensor that operates normally even at night when there is no light at all or in bad weather with a lot of snow and rain, may be used in an environment where a camera and a lidar may not function.

A range from the radar to the target may be obtained by observing a time taken for a signal propagated from the radar to hit the target and return. When the target is located at a position having specific azimuth angle and elevation angle other than in a front direction of the radar, a two-dimensional (2D) array antenna with antenna elements arranged in azimuth and elevation directions is required to estimate azimuth and elevation angles of the target. The longer the length of the antenna array and the greater the number of antenna elements, higher-resolution angle estimation is possible. However, as the number of antennas increases, the volume of a radar sensor and the complexity of a radar system may increase, such that a technique for generating and using a greater number of virtual antennas with a smaller number of transmitting antennas and receiving antennas by using a MIMO scheme has been typically employed.

However, even for the MIMO radar, the number of virtual antennas available is limited, and depending on which any of an altitude direction and an azimuth direction more virtual antennas are arranged in, a resolution of each direction is determined. When azimuth direction and elevation direction information of a target are obtained through the same number of virtual antennas, an azimuth direction resolution and an elevation direction resolution have a trade-off relationship therebetween. As a result, when an azimuth angle and an elevation angle are calculated using a typical method, any one of the azimuth direction resolution and the elevation direction resolution may be higher, and to obtain high resolutions for both the azimuth direction and the elevation direction, the volume of a radar sensor increases and the complexity of a radar system also increases.

SUMMARY

The present disclosure is proposed to solve these problems and aims to provide a method for obtaining altitude information of a target while maintaining a high azimuth resolution.

According to an exemplary embodiment of the present disclosure for achieving the above-described objective, a method for calculating an altitude of a target through an apparatus for calculating an altitude of the target, which comprises a plurality of multiple input multiple output (MIMO) radar virtual antennas, may comprise: receiving electromagnetic waves reflected from the target through a pair of virtual antennas classified into an upper antenna and a lower antenna and alternately arranged in two columns linearly; obtaining range information and phase information of the target from the pair of virtual antennas by analyzing the electromagnetic waves; and calculating altitude information of the target from position information of the pair of virtual antennas, and the range information and the phase information.

The plurality of MIMO radar virtual antennas may comprise a plurality of transmitting antennas and a plurality of receiving antennas.

The obtaining of the range information and the phase information of the target from the pair of virtual antennas by analyzing the electromagnetic waves may comprise obtaining the range information by using a time delay of the electromagnetic waves reflected by the target.

The calculating of the altitude information of the target from the position information of the pair of virtual antennas, and the range information and the phase information may comprise: applying a sphere equation for deriving the range information based on position information of each of the upper antenna and the lower antenna; and transforming the range information in the sphere equation into information about a phase difference of the target, calculated in the upper antenna and the lower antenna.

The method may further comprise displaying position information of the target comprising altitude information of the target in a form of a three-dimensional point scatterer by using fast Fourier transform (FFT).

According to another exemplary embodiment of the present disclosure for achieving the above-described objective, an apparatus for calculating an altitude of a target, which comprises a plurality of multiple input multiple output (MIMO) radar virtual antennas, may comprise: a processor; and a memory storing at least one command executed by the processor, wherein the at least one command comprises: a command for receiving electromagnetic waves reflected from the target through a pair of virtual antennas classified into an upper antenna and a lower antenna and alternately arranged in two columns linearly; a command for obtaining range information and phase information of the target from the pair of virtual antennas by analyzing the electromagnetic waves; and a command for calculating altitude information of the target from position information of the pair of virtual antennas, and the range information and the phase information.

The plurality of MIMO radar virtual antennas may comprise a plurality of transmitting antennas and a plurality of receiving antennas.

The command for obtaining range information and phase information of the target from the pair of virtual antennas by analyzing the electromagnetic waves may comprise a command for obtaining the range information by using a time delay of the electromagnetic waves reflected from the target.

The command for calculating altitude information of the target from position information of the pair of virtual antennas, and the range information and the phase information may comprise: a command for applying a sphere equation for deriving the range information based on position information of each of the upper antenna and the lower antenna; and a command for transforming the range information in the sphere equation into information about a phase difference of the target, calculated in the upper antenna and the lower antenna.

The at least one command may further comprise a command for displaying position information of the target including altitude information of the target in a form of a three-dimensional point scatterer by using fast Fourier transform (FFT).

According to an exemplary embodiment of the present disclosure, by obtaining the altitude information of the target without an azimuth resolution loss, the altitude information may be used in a radar system that requires a high azimuth resolution and at the same time, subsidiarily requires altitude information of the target.

BRIEF DESCRIPTION OF DRAWINGS

FIGS. 6A, 6B, 6C, 6D, 6E and 6F show examples of position information of a target without applying a method for calculating an altitude of a target according to the present disclosure.

FIGS. 7A, 7B, 7C, 7D, 7E and 7F show examples of position information of a target using a method for calculating an altitude of a target according to the present disclosure.

DETAILED DESCRIPTION OF THE EMBODIMENTS

Figure 1A:
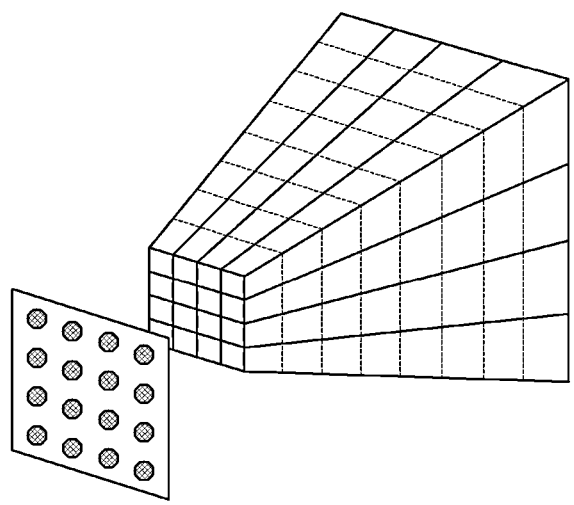
FIGS. 1A and 1B are views for describing a resolution according to a virtual antenna array.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings.

Figure 1B:
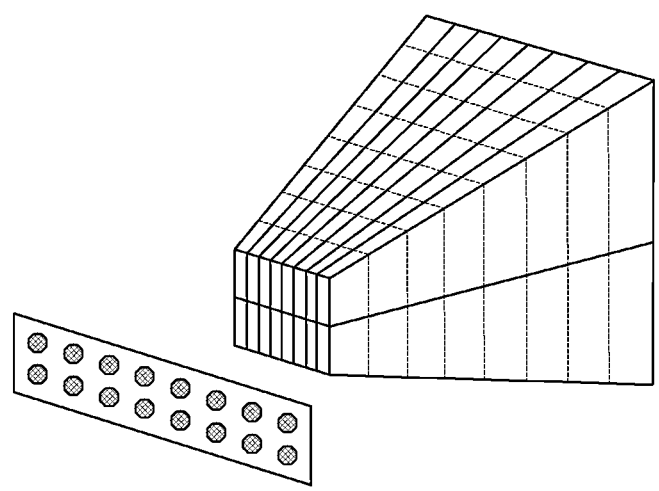

FIGS. 1A and 1B are views for describing a resolution according to a virtual antenna array.

Referring to FIGS. 1A and 1B, an angular resolution change of each direction with respect to multiple input multiple output (MIMO) radar virtual antenna arrangement is shown. In FIGS. 1A and 1B, virtual antennas are expressed as dots.

When a MIMO radar virtual antenna is arranged identically in an azimuth direction (a horizontal direction) and an elevation direction (a vertical direction), an angular resolution of each direction may have the same value. Meanwhile, when more virtual antennas are arranged in the azimuth direction as shown in FIG. 1B, an elevation angle resolution may decrease, whereas an azimuth angle resolution may be improved.

Figure 2A:
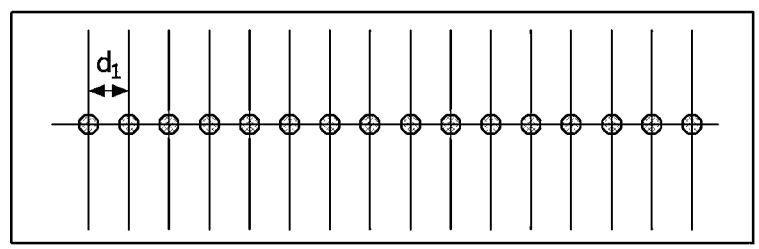
FIGS. 2A and 2B show an example of a virtual antenna array.
Figure 2B:
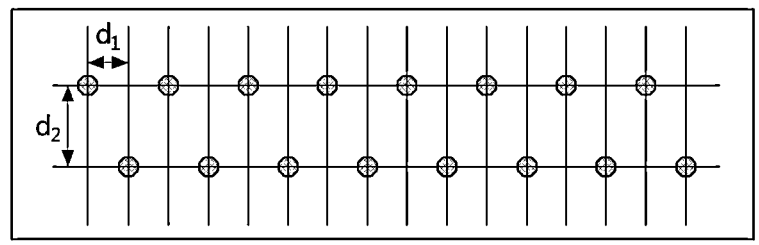

FIGS. 2A and 2B show an example of a virtual antenna array.

FIGS. 2A and 2B show an example where a total of 16 virtual antennas are formed using four transmitting antennas and four receiving antennas and the formed virtual antennas are arranged. Using the 16 virtual antennas is merely an example, and the number of virtual antennas of a radar system described in the present specification is not limited thereto.

Meanwhile, in the MIMO radar system, the number of virtual antennas may be determined by a product of the number of transmitting antennas and the number of receiving antennas. Positions of virtual antennas may be determined by an arrangement relationship between transmitting antennas and receiving antennas, and the virtual antennas may be arranged by properly arranging the transmitting antennas and the receiving antennas in forms shown in FIGS. 2A and 2B.

In FIGS. 2A and 2B, assuming that a horizontal direction is an azimuth direction of a radar and a vertical direction is an altitude direction, an azimuth resolution may be maximum when the virtual antennas all are arranged in the azimuth direction (the horizontal direction) as shown in FIG. 2A. However, for such arrangement, altitude information of a target may not be obtained. Meanwhile, when the virtual antennas are alternately arranged in two-column lines as shown in FIG. 2B, the altitude information of the target may be obtained while having a maximum azimuth resolution. FIG. 2B shows an arrangement form of virtual antennas proposed in the present disclosure. However, the arrangement form of the virtual antennas proposed in the present disclosure and the number of virtual antennas are not limited thereto.

Figure 3:
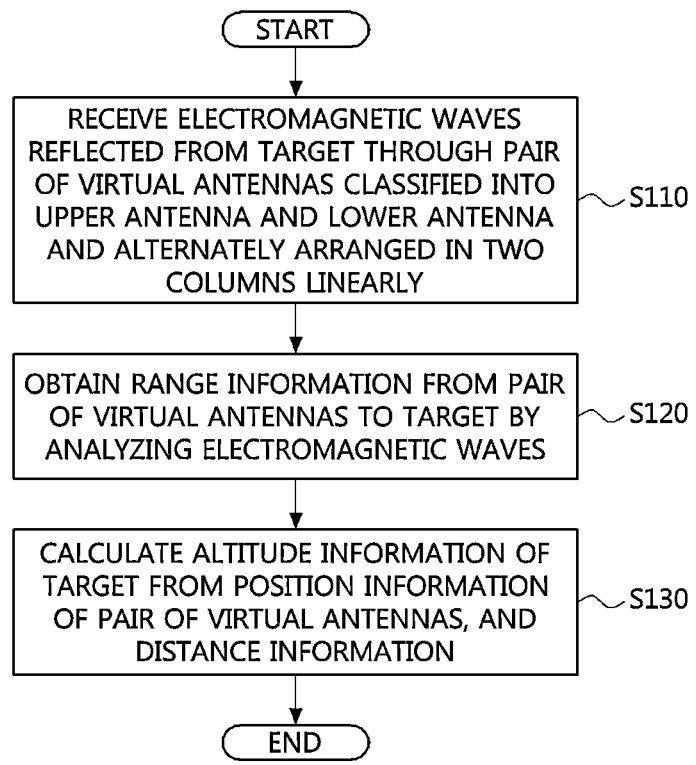
FIG. 3 is a flowchart illustrating a method for calculating an altitude of a target, according to an embodiment of the present disclosure.

FIG. 3 is a flowchart illustrating a method for calculating an altitude of a target, according to an embodiment of the present disclosure.

Referring to FIG. 3, the method for calculating an altitude of a target according to an embodiment of the present disclosure, as a method for calculating the altitude of the target by using an apparatus for calculating the altitude of the target, which includes a plurality of MIMO radar virtual antennas, may include operation S110 of receiving electromagnetic waves reflected from the target through a pair of virtual antennas alternately arranged in two-column lines by being classified into an upper antenna and a lower antenna.

Herein, the plurality of MIMO radar virtual antennas may include a plurality of transmitting antennas and a plurality of receiving antennas.

In addition, the present disclosure may include operation S120 of obtaining range information and phase information to the target from the pair of virtual antennas by analyzing the electromagnetic waves.

Herein, the operation of obtaining the range information and the phase information to the target from the pair of virtual antennas by analyzing the electromagnetic waves may include an operation of obtaining the range information by using a time delay of the electromagnetic waves reflected by the target.

In addition, the present disclosure may include operation S130 of calculating the altitude information of the target from position information of the pair of virtual antennas, and the range information and the phase information.

Herein, the operation of calculating the altitude information of the target from the position information of the pair of virtual antennas, and the range information and the phase information may include an operation of applying a sphere equation for deriving range information based on position information of each of the upper antenna and the lower antenna and an operation of transforming the range information in the sphere equation into information about a difference between a phase calculated in the upper antenna and a phase calculated in the lower antenna.

The present disclosure may further include an operation of displaying position information of the target including altitude information of the target in a form of a three-dimensional point scatterer, by using fast Fourier transform (FFT).

Figure 4:
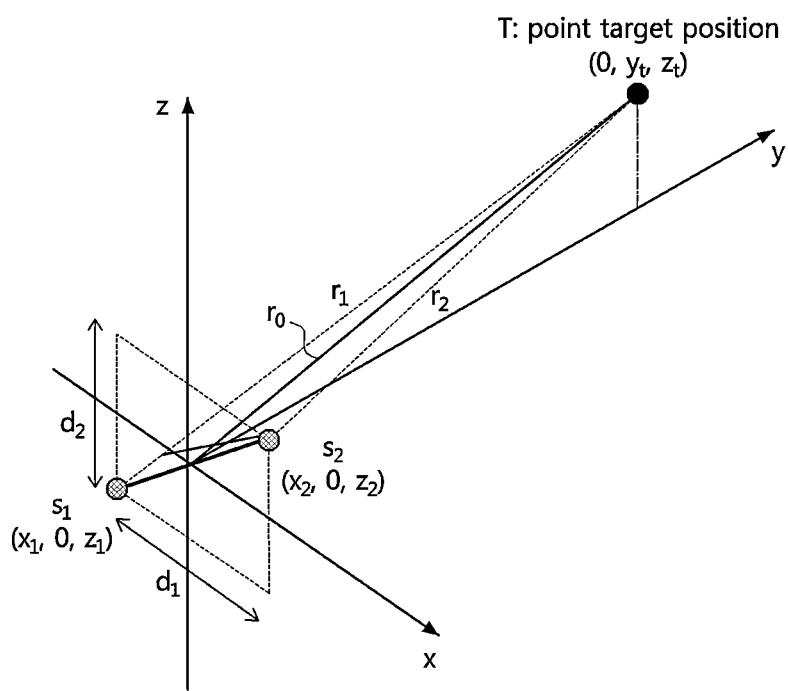
FIG. 4 is a conceptual view illustrating a method for calculating an altitude of a target, according to an embodiment of the present disclosure.

FIG. 4 is a conceptual view illustrating a method for calculating an altitude of a target, according to an embodiment of the present disclosure.

Referring to FIG. 4, a method for obtaining altitude information of a target by using two virtual antennas including a pair of one upper antenna and one lower antenna is shown.

In FIG. 4, it is assumed that an x axis indicates an azimuth direction, a y axis indicates a range direction, and a z direction indicates an elevation direction. Meanwhile, $S_1$ may mean a position $(x_1, 0, z_1)$ of the lower antenna, $S_2$ may mean a position $(x_2, 0, z_2)$ of the upper antenna, and T may mean a position $(0, y_t, z_t)$ of the target. Meanwhile, $d_1$ may mean a horizontal-direction range between the upper antenna and the lower antenna, and $d_2$ may mean a vertical-direction range between the upper antenna and the lower antenna.

By measuring a time delay of a signal returning after electromagnetic waves radiated from each virtual antenna hit the target, information on ranges $r_1$ and $r_2$ from the respective virtual antennas may be calculated. In this case, by using $r_1$ and $r_2$, the altitude information of the target may be obtained.

More specifically, by applying the sphere equation for deriving the range information, the altitude information of the target may be obtained. The sphere equation used herein is as below.

$$\begin{cases} (x-x_1)^2 + (y-0)^2 + (z-z_1)^2 = r_1^2 \\ (x-x_2)^2 + (y-0)^2 + (z-z_2)^2 = r_2^2 \end{cases} \quad \text{[Equation 1]}$$

Each sphere equation has, in common, coordinates $(0, y_t, z_t)$ of the target, and may input the coordinates of the target to Equation 1, which may be rearranged into Equation 2 as below.

$$\begin{cases} x_1^2 + y_t^2 + (z_t - z_1)^2 = r_1^2 \\ x_2^2 + y_t^2 + (z_t - z_2)^2 = r_2^2 \end{cases} \quad \text{[Equation 2]}$$

Equation 2 may be rearranged for altitude information of the target, $z_t$, into Equation 3.

$$z_t = \frac{(x_1 + x_2)(x_1 - x_2)}{2(z_1 - z_2)} + \frac{z_1 + z_2}{2} - \frac{(r_1 + r_2)(r_1 - r_2)}{2(z_1 - z_2)} \quad \text{[Equation 3]}$$

Herein, by using coordinate information of a virtual antenna and range information to a target observed by each virtual antenna, height information (altitude information) of the target may be obtained. However, considering a parameter of an actual radar system, Equation 3 may not be used. For example, for a vehicle radar system having a center frequency of about 79 GHz (gigahertz) and using a bandwidth of about 4 GHz (gigahertz), a wavelength of electric waves may be about 38 mm (millimeters) and a range resolution may be about 3.75 cm (centimeters). Thus, the ranges $r_1$ and $r_2$ to the target observed by the virtual antennas located at the positions $S_1$ and $S_2$ may have an almost same value, such that when the altitude information of the target is calculated using Equation 3, a value close to 0 (zero) may be obtained.

In the present disclosure, by using a phase difference instead of a difference in range from each virtual antenna to the target, the altitude information of the target may be calculated. For example, a difference $r_1$-$r_2$ between the ranges from the respective virtual antennas to the target in Equation 2 may be transformed into a phase difference, and $r_1$ and $r_2$ may be hardly different from each other, such that $(r_1+r_2)/2$ may be transformed into $r_0$ that is a range from the origin of a coordinate axis to the target and thus may be expressed as Equation 4.

$$z_t \cong \frac{(x_1+x_2)d1}{2d_2} + \frac{z_1+z_2}{2} + r_0\frac{\text{phase }(s_1/s_2)}{d_2(4\pi/\lambda)} \quad \text{[Equation 4]}$$

Thus, phase difference information of a signal obtained from one virtual antenna (the upper antenna) of upper arrangement and one virtual antenna (the lower antenna) of lower arrangement and coordinate information of each virtual antenna may be substituted into Equation 4 to obtain altitude information of a target in front of a radar. That is, when one upper antenna and one lower antenna are formed as one pair, altitude information of the target may be calculated, thus being applied to the entire virtual antenna array to obtain the altitude information of the target for the entire radar front image.

Figure 5:
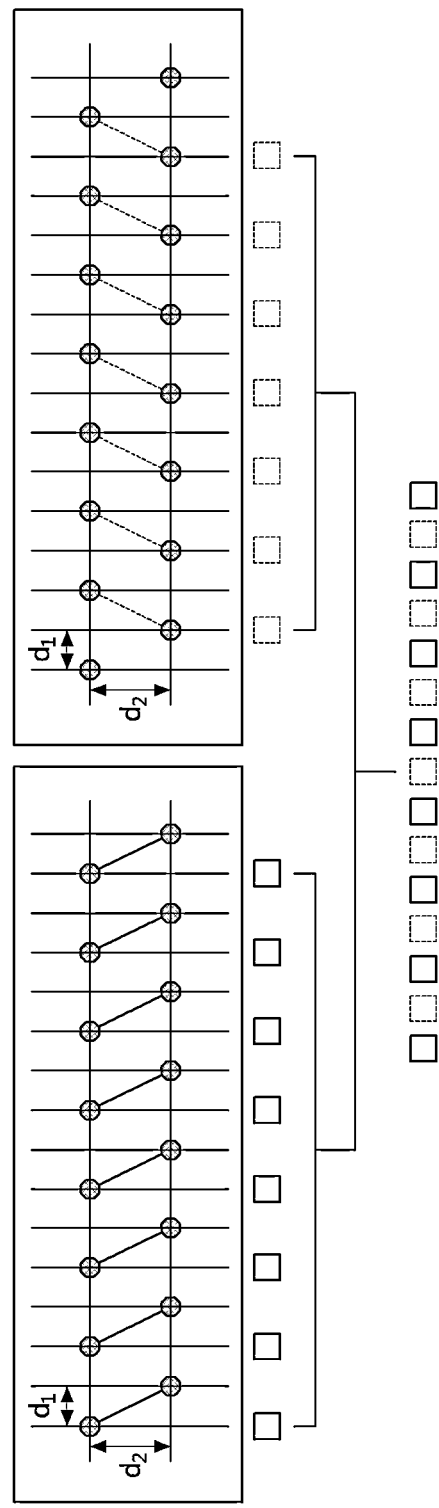
FIG. 5 is a diagram for describing a method for calculating an altitude of a target, according to the present disclosure.
Figure 6A:
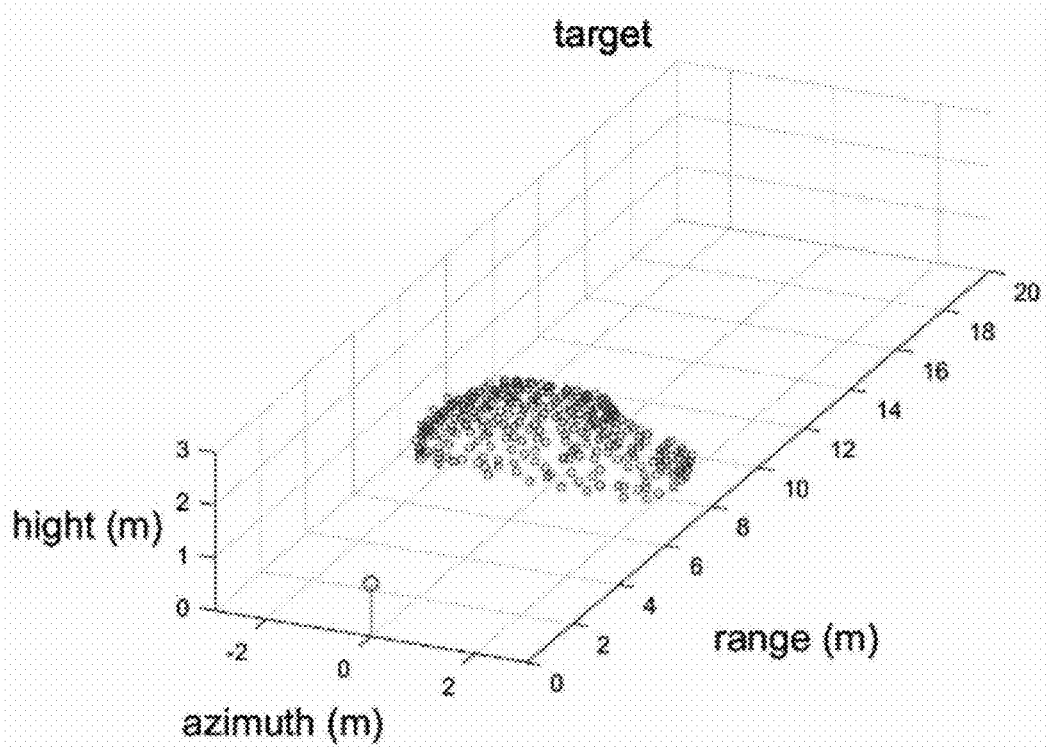
Figure 6E:
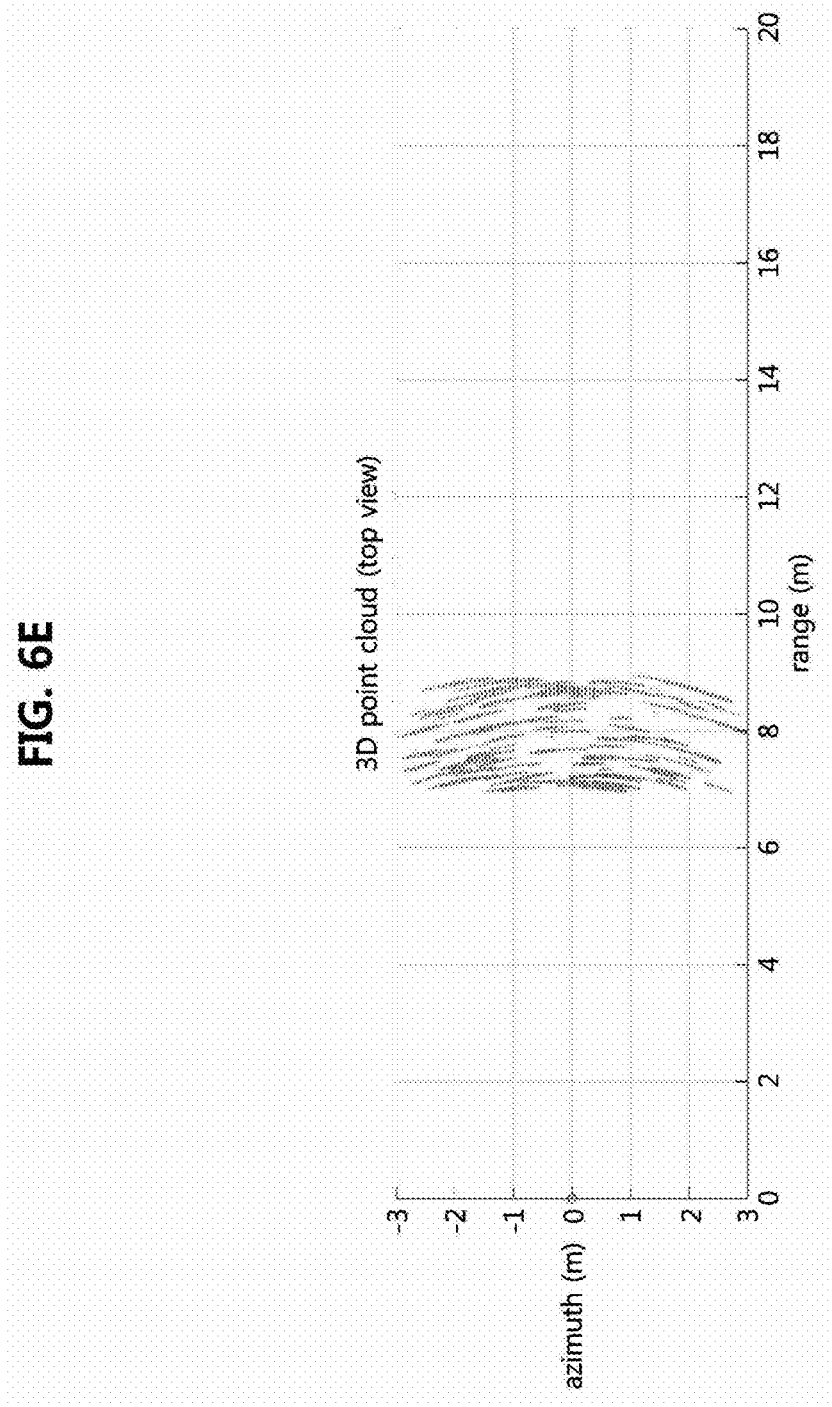

FIG. 5 is a diagram for describing a method for calculating an altitude of a target, according to the present disclosure.

Referring to FIG. 5, when a virtual antenna pair is formed according to an embodiment of the present disclosure, altitude information of a target, obtained from a left virtual antenna pair, and altitude information of the target, obtained from a right virtual antenna pair, may be combined to obtain altitude information of the entire front target.

FIGS. 6A, 6B, 6C, 6D, 6E and 6F show examples of position information of a target without applying a method for calculating an altitude of a target according to the present disclosure, and FIGS. 7A, 7B, 7C, 7D, 7E and 7F show examples of position information of a target using a method for calculating an altitude of a target according to the present disclosure.

Referring to FIGS. 6A through 6F and 7A through 7F, it may be seen that both a case of displaying information about a position of a target without using a method for calculating an altitude of the target according to the present disclosure and a case of displaying information about the position of the target using the method for calculating the altitude of the target according to the present disclosure are obtained through computer simulation. That is, it may be seen that position information of the target including altitude information of the target is displayed in the form of a three-dimensional point scatterer by using FFT.

Herein, the range resolution of the target may be determined by a bandwidth of the radar system, and a high range resolution may be secured when a sufficient bandwidth is used. In FIGS. 6A through 6F, a sufficiently high bandwidth is used and a range direction indicates a result of forming a three-dimensional scatterer of a high resolution. However, both the number of virtual antennas arranged in the azimuth direction and the number of virtual antennas arranged in the elevation direction are insufficient, both directions indicate low resolutions.

However, in FIGS. 7A through 7F, virtual antennas are alternately arranged in two columns linearly according to an embodiment of the present disclosure, range information and azimuth information of the target are obtained using an FFT scheme, and altitude information is obtained using the method for calculating the altitude according to the present disclosure, thus displaying the result of forming the three-dimensional point scatterer. Referring to this, it may be seen that the present disclosure simultaneously satisfies a higher azimuth resolution and a higher elevation resolution than when the present disclosure is not applied.

Figure 8:
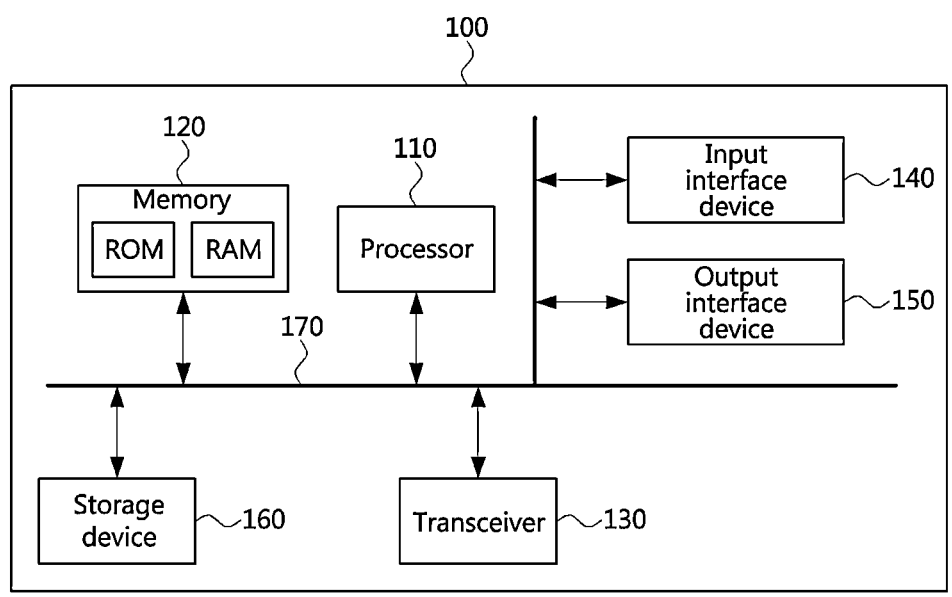
FIG. 8 is a block diagram of an apparatus for calculating an altitude of a target, according to another embodiment of the present disclosure.

FIG. 8 is a block diagram of an apparatus for calculating an altitude of a target, according to another embodiment of the present disclosure.

Referring to FIG. 8, an apparatus 100 for calculating an altitude of a target according to an embodiment of the present disclosure may include a processor 110, a memory 120 that stores at least one command executed through the processor 110 and a result of executing the command, and a transmitting/receiving device 130 that performs communication in connection with a network.

The apparatus 100 for calculating the altitude of the target may further include an input interface device 140, an output interface device 150, a storing device 160, etc. Respective components included in the apparatus 100 for calculating the altitude of the target may be connected by a bus 170 to perform communication with one another.

The processor 110 may execute a program command stored in at least one of the memory 120 and the storing device 160. The processor 110 may mean a central processing unit (CPU), a graphics processing unit (GPU), or a dedicated processor on which methods according to an embodiment of the present disclosure are performed. Each of the memory 120 and the storing device 160 may be configured of at least one of a volatile storage medium and a non-volatile storage medium. For example, the memory 120 may include at least one of read-only memory (ROM) and random-access memory (RAM).

The storing device 160 may store a sphere equation used in the present disclosure, position information of virtual antennas, a form in which the virtual antennas are alternately arranged in two columns linearly, the number of virtual antennas, range information from the virtual antenna to the target, and altitude information of the target.

Herein, the at least one command may include a command for receiving electromagnetic waves reflected from a target through a pair of virtual antennas classified into an upper antenna and a lower antenna and alternately arranged in two columns linearly; a command for obtaining range information from the pair of virtual antennas to the target and phase information by analyzing the electromagnetic waves; and a command for calculating altitude information of the target from position information of the pair of virtual antennas, and the range information and the phase information.

In addition, the command for obtaining the range information and the phase information to the target from the pair of virtual antennas by analyzing the electromagnetic waves may include a command for obtaining the range information by using a time delay of the electromagnetic waves reflected by the target.

Meanwhile, the command for calculating altitude information of the target from the position information of the pair of virtual antennas, and the range information and the phase information may include a command for applying a sphere equation for deriving range information based on position information of each of the upper antenna and the lower antenna and a command for transforming the range information in the sphere equation into information about a difference between a phase calculated in the upper antenna and a phase calculated in the lower antenna.

In addition, the at least one command may further include a command for displaying position information of the target including altitude information of the target in the form of a three-dimensional point scatterer by using FFT.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

Although the present disclosure has been described with reference to preferred embodiments, it will be apparent to those skilled in the art that the present disclosure may be variously changed and modified without departing from the spirit and scope of the disclosure defined in the following claims.

What is claimed is:

1. A method for calculating an altitude of a target through an apparatus for calculating an altitude of the target, which comprises a plurality of multiple input multiple output (MIMO) radar virtual antennas, the method comprising:
receiving electromagnetic waves reflected from the target through a pair of virtual antennas classified into an upper antenna and a lower antenna and alternately arranged in two columns linearly;
obtaining range information and phase information of the target from the pair of virtual antennas by analyzing the electromagnetic waves; and
calculating altitude information of the target from position information of the pair of virtual antennas, and the range information and the phase information,
wherein the calculating of the altitude information of the target from the position information of the pair of virtual antennas, and the range information and the phase information comprises:
applying a sphere equation for deriving the range information based on position information of each of the upper antenna and the lower antenna.

2. The method of claim 1, wherein the plurality of MIMO radar virtual antennas comprise a plurality of transmitting antennas and a plurality of receiving antennas.

3. The method of claim 1, wherein the obtaining of the range information and the phase information of the target from the pair of virtual antennas by analyzing the electromagnetic waves comprises obtaining the range information by using a time delay of the electromagnetic waves reflected by the target.

4. The method of claim 1, wherein the calculating of the altitude information of the target from the position information of the pair of virtual antennas, and the range information and the phase information further comprises:
transforming the range information in the sphere equation into information about a phase difference of the target, calculated in the upper antenna and the lower antenna.

5. The method of claim 1, further comprising displaying position information of the target comprising altitude information of the target in a form of a three-dimensional point scatterer by using fast Fourier transform (FFT).

6. An apparatus for calculating an altitude of a target, which comprises a plurality of multiple input multiple output (MIMO) radar virtual antennas, the apparatus comprising:
a processor; and
a memory storing at least one command executed by the processor,
wherein the at least one command comprises:
a command for receiving electromagnetic waves reflected from the target through a pair of virtual antennas classified into an upper antenna and a lower antenna and alternately arranged in two columns linearly;
a command for obtaining range information and phase information of the target from the pair of virtual antennas by analyzing the electromagnetic waves; and
a command for calculating altitude information of the target from position information of the pair of virtual antennas, and the range information and the phase information,
wherein the command for calculating altitude information of the target from position information of the pair of virtual antennas, and the range information and the phase information comprises:
a command for applying a sphere equation for deriving the range information based on position information of each of the upper antenna and the lower antenna.

7. The apparatus of claim 6, wherein the plurality of MIMO radar virtual antennas comprise a plurality of transmitting antennas and a plurality of receiving antennas.

8. The apparatus of claim 6, wherein the command for obtaining range information and phase information of the target from the pair of virtual antennas by analyzing the electromagnetic waves comprises a command for obtaining the range information by using a time delay of the electromagnetic waves reflected from the target.

9. The apparatus of claim 6, wherein the command for calculating altitude information of the target from position information of the pair of virtual antennas, and the range information and the phase information further comprises:
a command for transforming the range information in the sphere equation into information about a phase difference of the target, calculated in the upper antenna and the lower antenna.

10. The apparatus of claim 6, wherein the at least one command further comprises a command for displaying position information of the target including altitude information of the target in a form of a three-dimensional point scatterer by using fast Fourier transform (FFT).

\* \* \* \* \*